(12) United States Patent
Morris

(10) Patent No.: US 7,819,383 B2
(45) Date of Patent: Oct. 26, 2010

(54) THREE-POSITION SELECTOR VALVE

(75) Inventor: John M. Morris, Auburn, WA (US)

(73) Assignee: Norgren GT Development Corporation, Auburn, WA (US)

( * ) Notice: Subject to any disclaimer, the term of this patent is extended or adjusted under 35 U.S.C. 154(b) by 600 days.

(21) Appl. No.: 11/693,593

(22) Filed: Mar. 29, 2007

(65) Prior Publication Data

US 2008/0237522 A1 Oct. 2, 2008

(51) Int. Cl.
 *F16K 25/00* (2006.01)
(52) U.S. Cl. ............... 251/162; 251/180; 251/192; 251/263
(58) Field of Classification Search ........ 251/160, 251/162, 176, 180, 181, 182, 192, 251, 253, 251/262, 263, 304; 137/625.41, 625.46, 137/625.47
See application file for complete search history.

(56) References Cited

U.S. PATENT DOCUMENTS

| | | | | |
|---|---|---|---|---|
| 2,534,577 A | * | 12/1950 | Courtot | 251/176 |
| 3,406,943 A | * | 10/1968 | Newell | 251/163 |
| 3,913,618 A | * | 10/1975 | Speedie | 137/874 |
| 4,287,908 A | | 9/1981 | Storgard | |
| 4,436,116 A | * | 3/1984 | Billeter | 137/625.47 |
| 4,502,453 A | | 3/1985 | Kabasin et al. | |
| 4,683,864 A | | 8/1987 | Bucci | |
| 4,934,408 A | * | 6/1990 | Christopherson | 137/625.46 |
| 5,188,149 A | * | 2/1993 | Williams | 137/625.47 |
| 5,379,740 A | | 1/1995 | Moore et al. | |

* cited by examiner

*Primary Examiner*—John K Fristoe, Jr.
(74) *Attorney, Agent, or Firm*—The Ollila Law Group LLC

(57) ABSTRACT

A selector valve (102) having at least first and second ports (108 and 110) is provided. The selector valve includes a closure element (120) selectively displaceable between a first position, wherein the closure element (120) sealingly engages the first port (108), and a second position, wherein the closure element (120) sealingly engages the second port (110). The selector valve (102) further includes a cam assembly that is configured to bias the closure element (120) into at least the first or second position in a manner such that the closure element (120) does not come into substantial contact with the first or second port (108 or 110) when being moved into the first or second position.

17 Claims, 7 Drawing Sheets

THREE-POSITION SELECTOR VALVE

BACKGROUND

Valves are commonly used to control fluid passing through a pipe or a fluid system. To effectively regulate the flow of the fluid, the valve must be able to contain the fluid without external leakage, it must be able to withstand the pressure of the fluid, and the plug or closure element should be able to withstand wear and distortion over time.

Fluid systems use many different types of valve assemblies. Selector valves are used to direct flow coming from or going to multiple sources. For instance, Class 8 vehicles often include a fuel storage arrangement that utilizes multiple fuel tanks. Such an arrangement requires the use of a fuel selector valve assembly to draw fuel from one or two tanks and return fuel to the tanks. Although current fuel selector valve assemblies are effective, they are not without their problems. Many fuel selector valve assemblies fail to sufficiently control the flow of fuel between the fuel selector valve and the fuel tanks, thereby leading to inefficiencies. As a non-limiting example, many fuel selector valve assemblies allow unwanted siphoning due to vehicle attitude. Moreover, the design of the fuel selector valve often causes valve components to wear over time, leading to leakage and failure.

The present application depicts at least one embodiment of a low cost, reliable, efficient selector valve that may be used with any suitable selector valve assembly.

SUMMARY

A selector valve having at least first and second ports is provided. The selector valve includes a closure element selectively displaceable between a first position, wherein the closure element sealingly engages the first port, and a second position, wherein the closure element sealingly engages the second port. The selector valve further includes a cam assembly that is configured to bias the closure element into at least the first or second position in a manner such that the closure element does not come into substantial contact with the first or second port when being moved into the first or second position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become understood by reference to the following detailed description, when taken in conjunction with the accompanying drawings, wherein.

DETAILED DESCRIPTION

Figure 1:
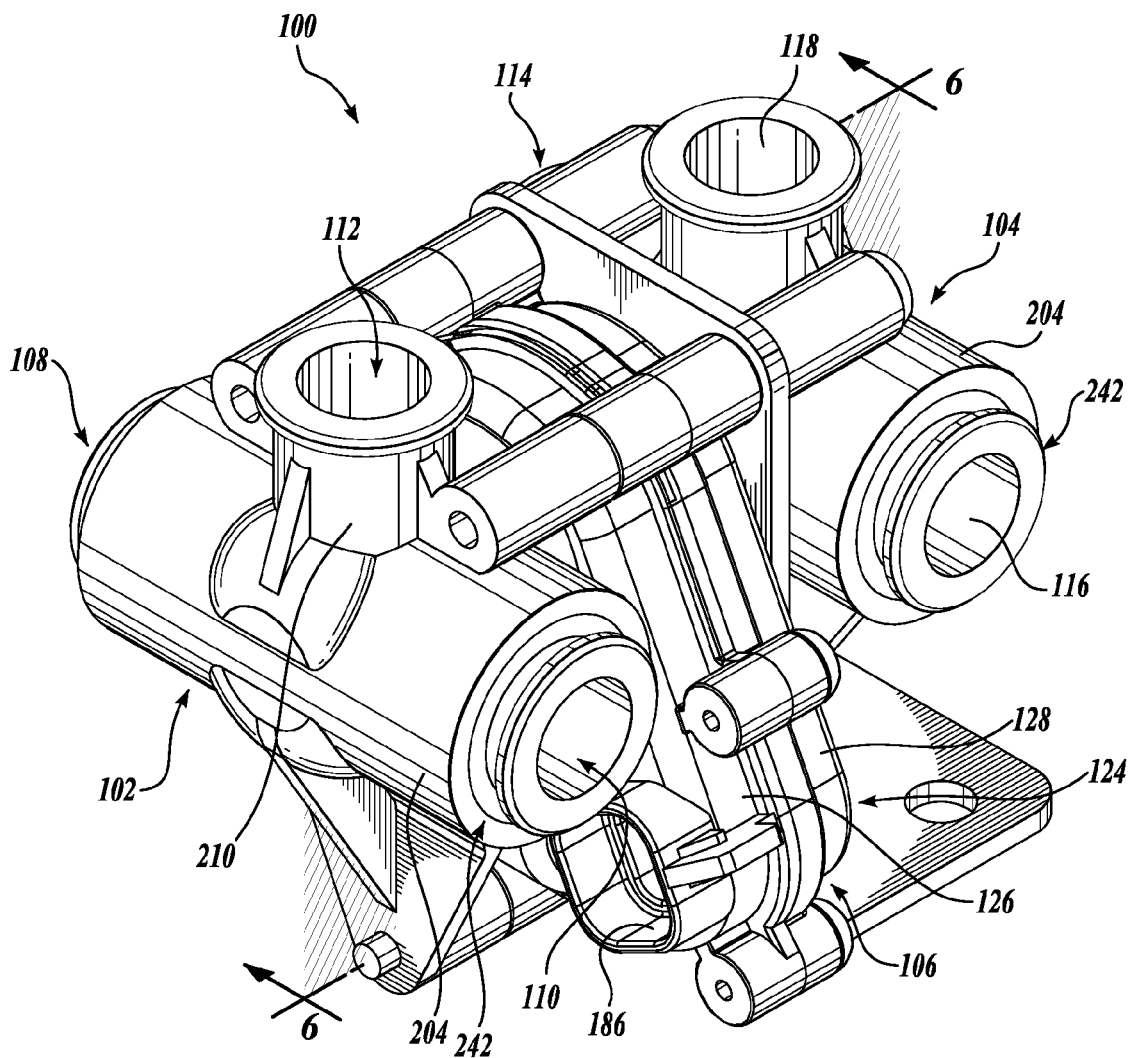
FIG. 1 is an environmental view of first and second selector valves embodied in a representative fuel selector valve assembly constructed in accordance with one embodiment of the present disclosure.

The present disclosure depicts a selector valve for selectively placing at least one external source of fluid, air, etc. in communication with one or more other external sources. As a non-limiting example and for ease of illustration and description only, a selector valve constructed in accordance with one embodiment of the present disclosure is shown in FIGS. 1-8 embodied within a representative fuel selector valve assembly 100. The fuel selector valve assembly includes a first selector valve, or fuel draw valve 102, a second selector valve, or fuel return valve 104, and a drive system 106 disposed therebetween.

Although the first and second selector valves are shown embodied within a fuel selector valve assembly 100, it should be appreciated that the disclosed first and/or second selector valves may instead be used in many other valve assemblies and systems. Thus, it should be appreciated that the description of the selector valve in a fuel selector valve assembly 100 is for illustrative purposes only, and should not be construed as limiting the claimed subject matter.

The fuel draw valve 102 of the fuel selector valve assembly 100 includes first and second fuel tank draw ports 108 and 110 and an engine draw port 112. The first and second fuel tank draw ports 108 and 110 are adapted to be placed into fluid communication in any well-known manner with first and second fuel tanks (not shown) of a vehicle. It should be appreciated that the first and second fuel tank draw ports 108 and 110 may instead be placed in fluid communication with multiple fuel tanks. The engine draw port 112 is adapted to be placed into fluid communication with an engine.

The fuel return valve 104 includes first and second fuel tank return ports 114 and 116 and an engine return port 118, wherein the first and second fuel tank return ports 114 and 116 are adapted to be placed in fluid communication with the first and second fuel tanks, and the engine return port 118 is adapted to be placed into fluid communication with the engine. Similar to the first and second fuel tank draw ports 108 and 110, the first and second fuel tank return ports 114 and 116 may instead be placed in fluid communication with multiple fuel tanks.

Figure 4:
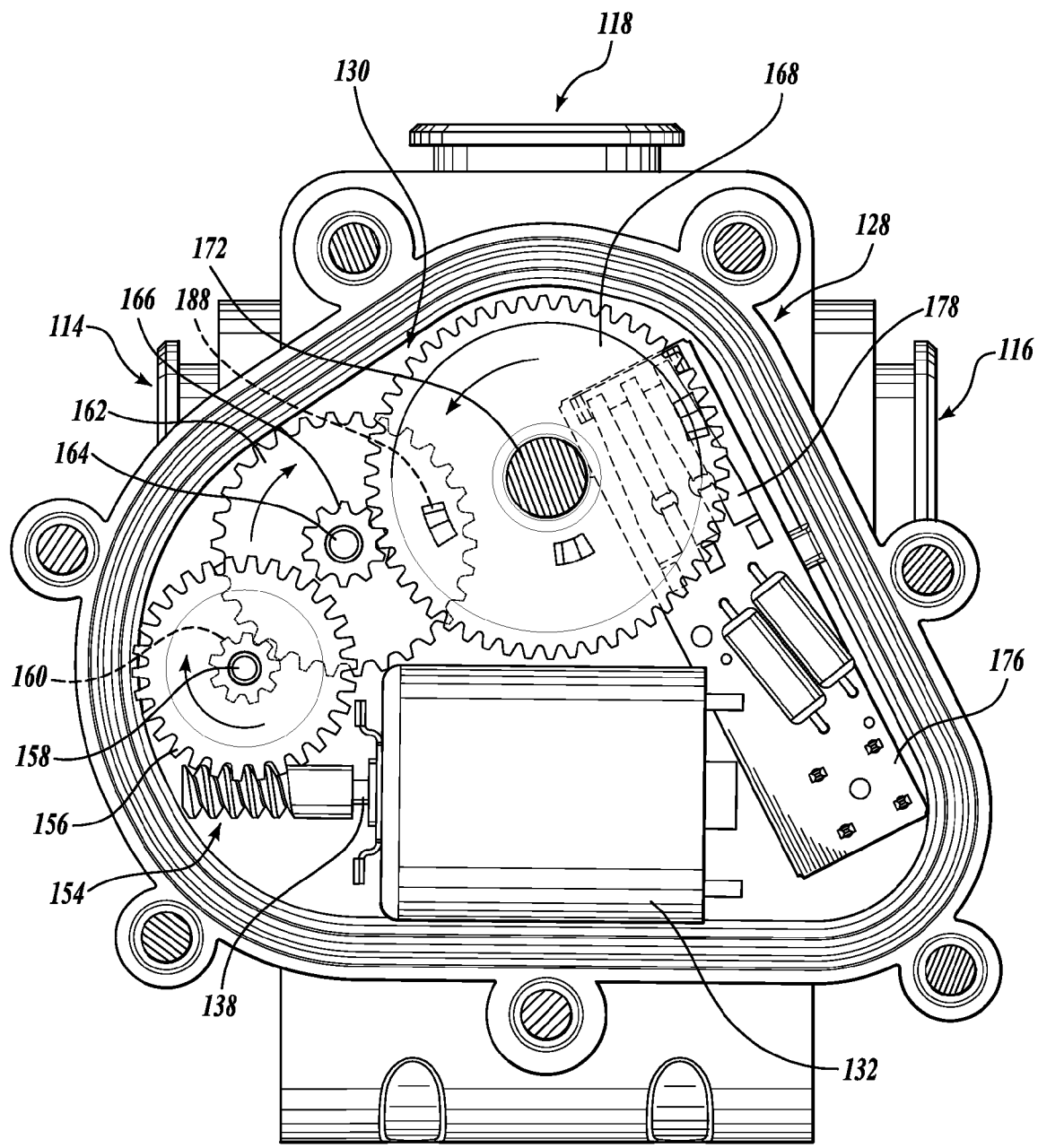
FIG. 4 is a sectional view of the fuel selector valve assembly of FIG. 3, taken substantially through Section 4-4 of FIG. 3.
Figure 5:
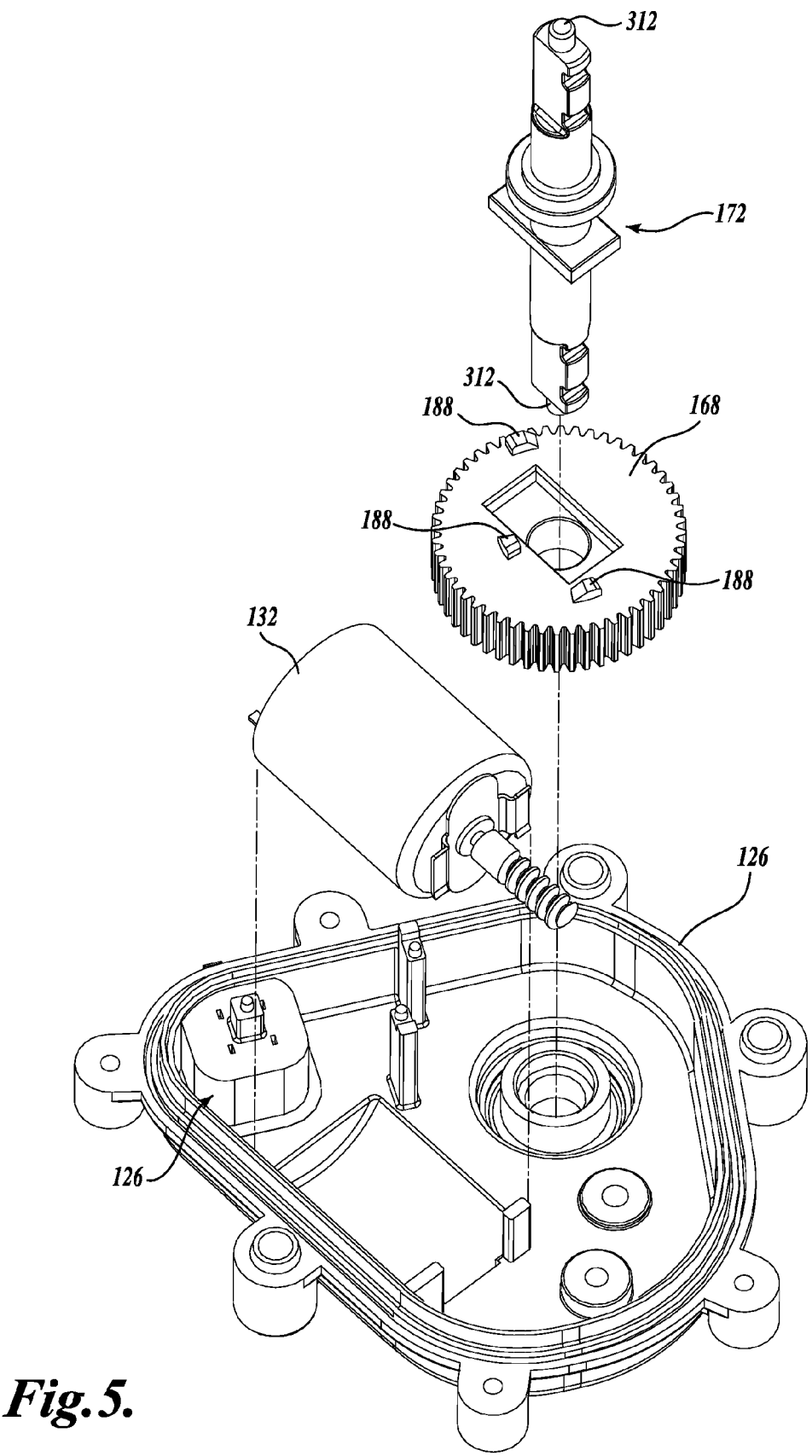
FIG. 5 is an exploded view of a first housing receptacle for the fuel selector valve assembly of FIG. 1, showing a drive gear, a drive axle, and a motor.

As may best be seen by referring to FIGS. 1 and 4, the fuel selector valve assembly 100 includes a drive system 106 having a gear motor housing 124 formed by coupling first and second housing halves 126 and 128 together in any well-known manner. Disposed within the motor housing 124 is a gear assembly 130 and motor 132.

The motor 132 is any well-known electrical motor, such as a conventional brush or brushless motor with an output shaft 138. The motor 132 may include a contact (not shown) for connecting the motor 132 to an external power source and control system, thus allowing for selective actuation of the motor 132. The output shaft 138 of the motor 132 includes a worm gear 154 fixedly coupled in a coaxial manner thereto.

Still referring to FIG. 4, the worm gear 154 is mechanically coupled to a first spur gear 156, which is journaled for rotation on a first gear axle 158. A second spur gear 160 is also journaled for rotation on the first gear axle 158. A third spur gear 162 is journaled for rotation on a second gear axle 164 and is mechanically coupled to the second spur gear 160 for rotation therewith. A fourth spur gear 166 is journaled for rotation on the second gear axle 164 and is mechanically coupled to a drive gear 168 journaled for rotation within the housing on a drive axle 172.

Figure 2:
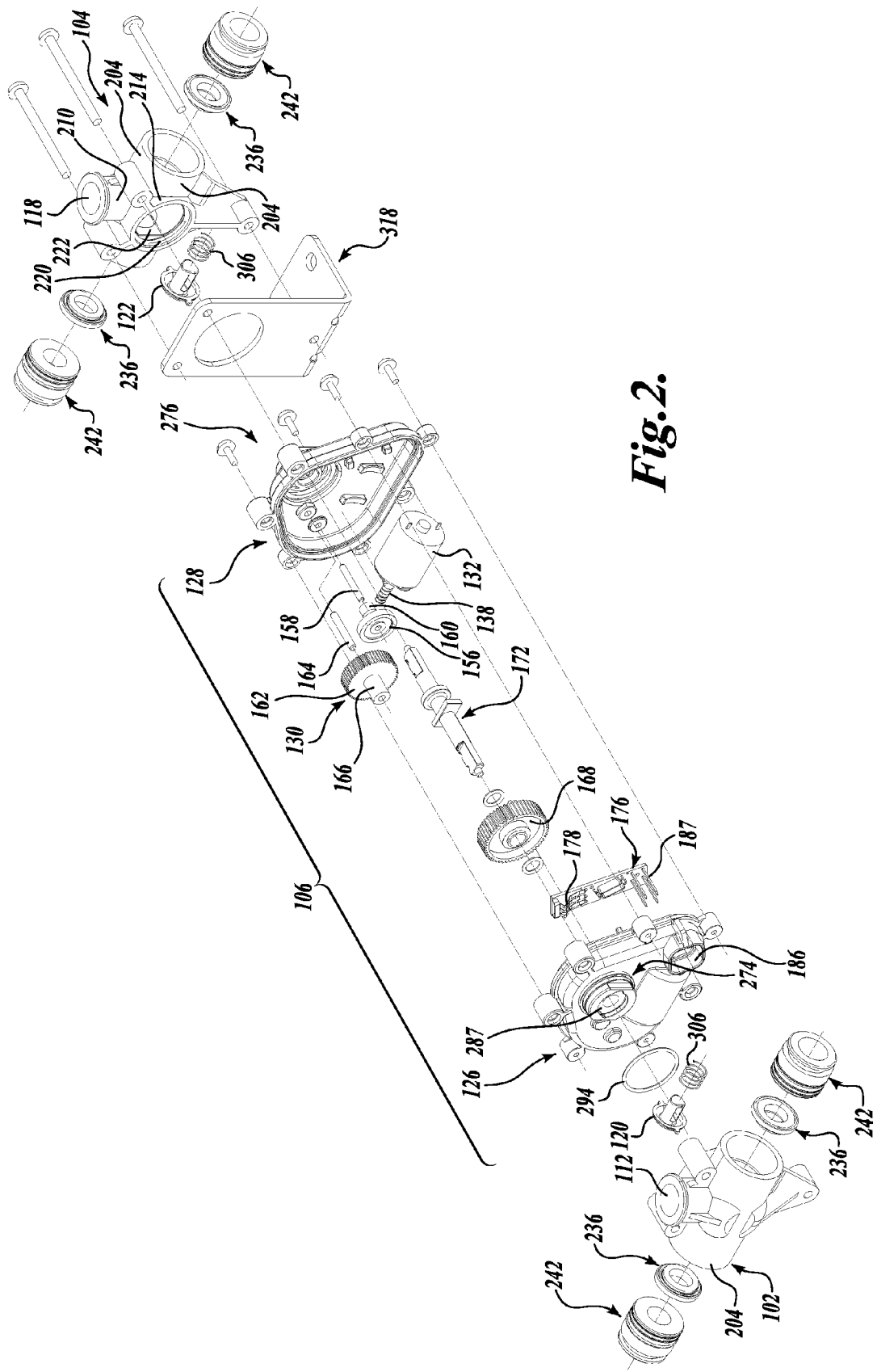
FIG. 2 is an exploded view of the fuel selector valve assembly of FIG. 1.
Figure 6:
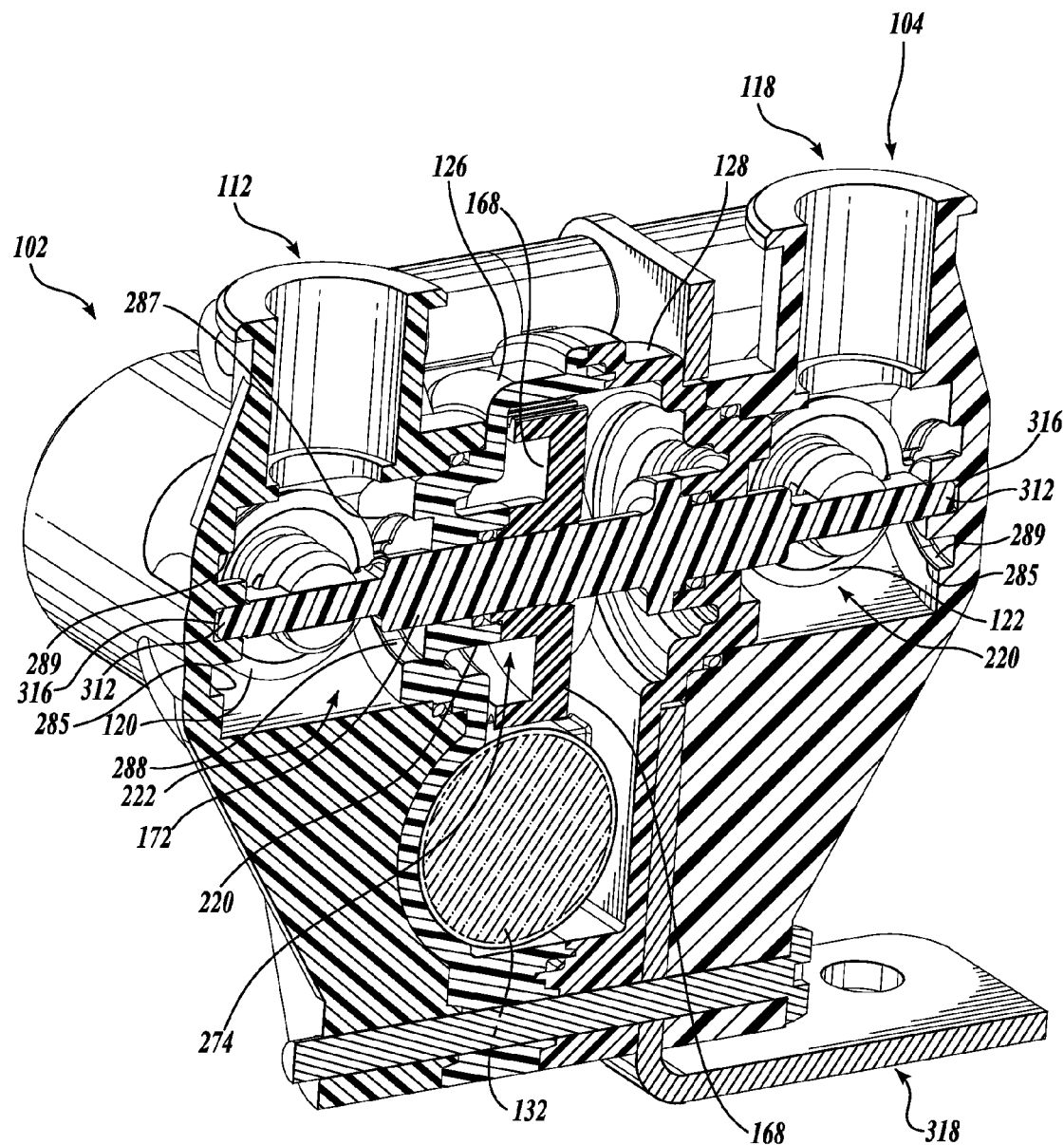
FIG. 6 is a cross sectional view of the fuel selector valve assembly of FIG. 1 depicting the first and second selector valves, taken substantially through Section 6-6.

Referring to FIGS. 2 and 6, the drive axle 172 is suitably a rod-shaped member having one end shaped and configured to mechanically connect in a keyed manner or any other suitable manner to the fuel draw valve 102. The other end of the drive axle 172 is shaped and configured to mechanically connect to the fuel return valve 104. If mechanically connecting the fuel return valve 104 is not required, however, the second end of the drive axle 172 may be truncated.

Still referring to FIGS. 2 and 6, first and second closure elements are received on opposite ends of the drive axle 172. Preferably, the first and second closure elements consist of first and second ball valves 120 and 122. As can best be seen by referring to FIGS. 7 and 8, each ball valve 120 and 122 includes a stem 302, a coil spring 306 disposed on the stem 302, a rounded ball cap 304 coupled to the end of the stem 302, and two opposing ball posts 292 extending outwardly and laterally from the ball cap 304. The first and second ball valves 120 and 122 are received on the ends of the drive axle 172 in a manner well-known in the art such that the drive axle 172 passes through the stem 302 and the ball cap 304 extends outwardly therefrom. The coil spring 306 is disposed between each ball cap 304 and the drive axle 172 such that the ball valves 120 and 122 are spring-loaded outwardly from the drive axle 172. The ball valves 120 and 122 may instead be attached to the drive axle 172 in any suitable manner such that the ball valves 120 and 122 are continuously biased in a direction opposite the drive axle 172. Although a ball valve is suitable for use as a closure element, other types of valves or closure elements are also within the scope of the present disclosure.

Referring to FIGS. 2 and 6, the motor housing 124 includes first and second gear/motor interface portions 274 and 276 formed on the exterior of the first and second housing halves 126 and 128 for interfacing the fuel draw valve 102 and the fuel return valve 104, respectively. Each gear/motor interface portions 274 and 276 defines a first cam 287 having a first cam surface 288. The first cam 287 is part of a cam assembly, which also includes a second cam 285. The first cam 287 is substantially identical in shape and size to the second cam 285 formed within the fuel draw valve 102, which is described in greater detail below with respect to FIG. 7. Therefore, a detailed description of the first cam 287 will be omitted. Each of the first and second gear/motor interface portions 274 and 276 includes at least one O-ring 294 (only one O-ring 294 is illustrated in FIG. 2 for clarity). The O-ring 294 is received around a portion of gear/motor interface portion and provides a seal when the gear/motor interface portion 274 or 276 engages the cam-receiving portion 220 of the fuel draw valve 102 or fuel return valve 104, respectively, as described in greater detail below.

As may best be seen by referring to FIG. 4, the selector valve 100 further includes a printed circuit board 176 mounted within the second housing receptacle 128. The printed circuit board 176 includes a plurality of sensors or switches 178, wherein each switch 178 engages one of the protrusions 188 (see also FIG. 5) formed on one surface of the drive gear 168 when the drive gear 168 rotates. The printed circuit board 176 is electrically coupled at one end to pins 187 of an electrical connector 186, as shown in FIG. 2, for placing the circuit board 176 in electrical communication with an external control system (not shown). A protrusion 188 engages a switch 178 when the drive gear 168 is rotated to displace the fuel draw valve 102 into one of the positions, thereby tripping the switch 178 and sending a signal to the motor 132 to turn off.

Figure 7:
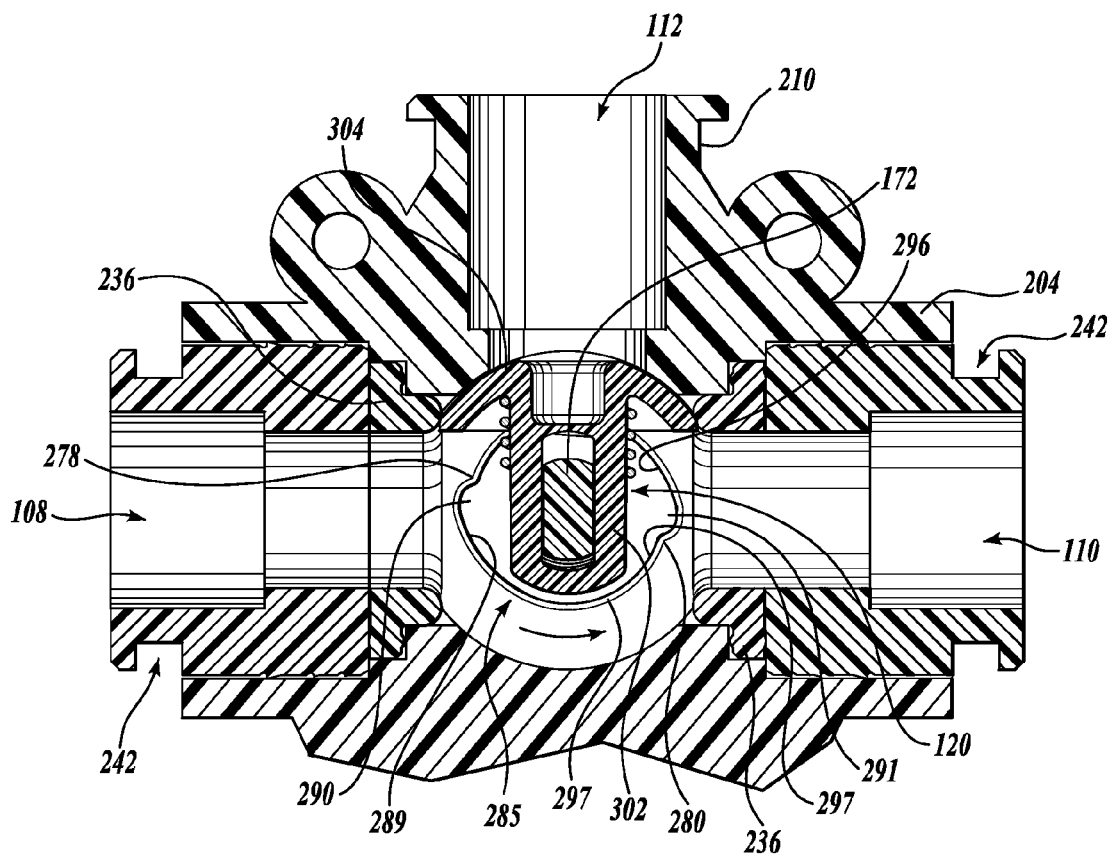
FIG. 7 is a partial cross-sectional view of the first selector valve of the fuel selector valve assembly of FIG. 1, taken substantially through Section 7-7 of FIG. 3.

The structure of the fuel draw valve 102 may best be understood by referring to FIGS. 1 and 7. The fuel return valve 104 is substantially identical in size and shape; therefore, only the fuel draw valve 102 will be described. The fuel draw valve 102 includes a hollow cylindrical valve body 204 with two open ends that define the first fuel tank draw port 108 and the second fuel tank draw port 110. A first hollow cylindrical member 210 intersects the hollow cylindrical valve body 204 in substantially the center of the valve body 204 to form the engine draw port 112. The interior of the first hollow cylindrical member 210 is in fluid communication with the interior of the hollow cylindrical valve body 204.

A second, hollow, open-ended cylindrical member 214 intersects the hollow cylindrical valve body 204 in substantially the center of the valve body 204 to form a cam-receiving portion 220 (see the fuel return valve 104 in FIG. 2). The interior of the second hollow cylindrical member 214 is in fluid communication with the interior of the hollow cylindrical valve body 204.

Figure 8:
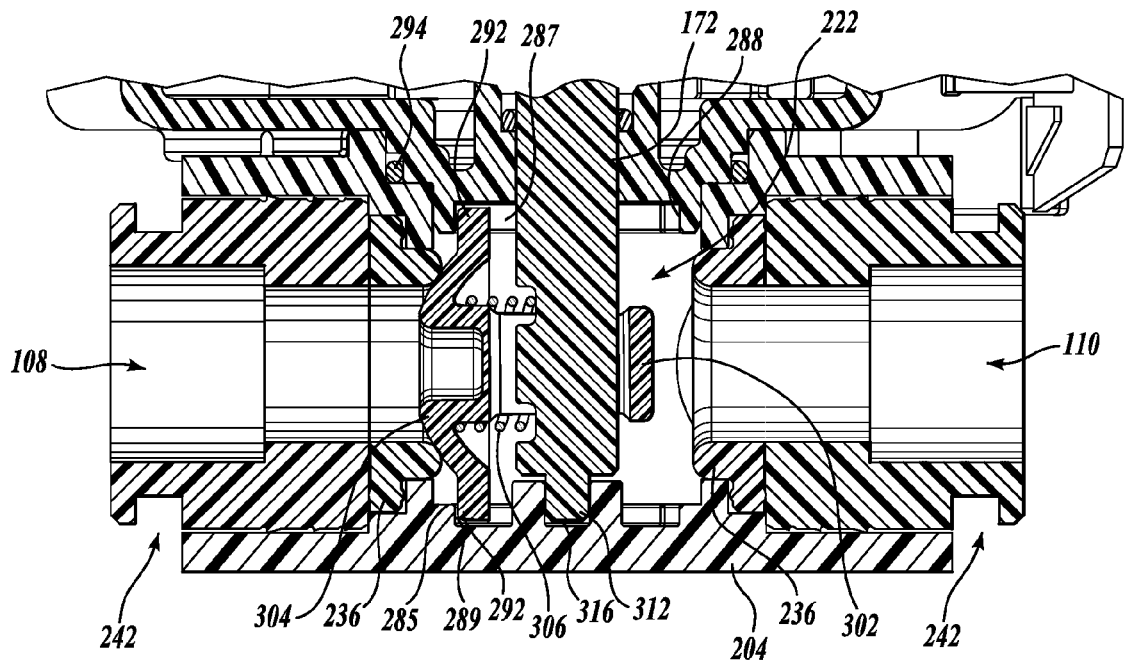
FIG. 8 is a partial cross-sectional view of the first selector valve of the fuel selector valve assembly of FIG. 1, taken substantially through Section 8-8 of FIG. 3.

Referring to FIGS. 7 and 8, the intersection of the first hollow cylindrical member 210, second hollow cylindrical member 214, and hollow cylindrical valve body 204 defines a ball valve receptacle 222. The interior closed end of the second hollow cylindrical member 214 includes a second cam 285 that defines a second cam surface 289. Disposed within the middle of the cam 285 is an annular projection that defines a cylindrical receptacle 316.

The second cam 285 is substantially oval in shape having arcuate upper and lower cam surfaces 296 and 297. As the upper cam surface 296 extends towards the first fuel tank draw port 108, the upper cam surface 296 gradually extends inwardly towards the middle of the cam 285 to eventually define a first lip 278 near the intersection of the upper and lower cam surfaces 296 and 297. The first lip 278 defines a first pocket 290 adjacent thereto between the upper and lower cam surfaces 296 and 297.

As the lower cam surface 297 extends towards the second fuel tank draw port 110, the lower cam surface 297 gradually extends inwardly towards the middle of the cam 285 to eventually define a second lip 280 near the intersection of the upper and lower cam surfaces 296 and 297. The second lip 280 defines a second pocket 291 adjacent thereto between the upper and lower cam surfaces 296 and 297.

Still referring to FIGS. 7 and 8, an annular seal 236 is received within the first and second fuel tank draw ports 108 and 110. The contour of the annular seal 236 substantially conforms to the shape of the inside surface of the fuel tank draw ports 108 and 110 such that the annular seal 236 is sealingly received therewithin. A hollow connector plug 242 is also received within the first and second fuel tank draw ports 108, 110 such that the connector plug 242 abuts the annular seal 236. The connector plug 242 substantially conforms to the size of the interior surface of the first and second fuel tank draw ports 108 and 110 to form a friction fit therebetween.

The connector plug 242 is suitably shaped to receive a standard valve fitting (not shown) therewithin, such as any number of commonly known fitting systems. A valve fitting is similarly received within the engine draw port 112. Any suitable fuel line or tube (not shown) may be coupled to the valve fittings to either draw fuel into the fuel draw valve 102 or carry fuel out of the fuel draw valve 102.

Figure 3:
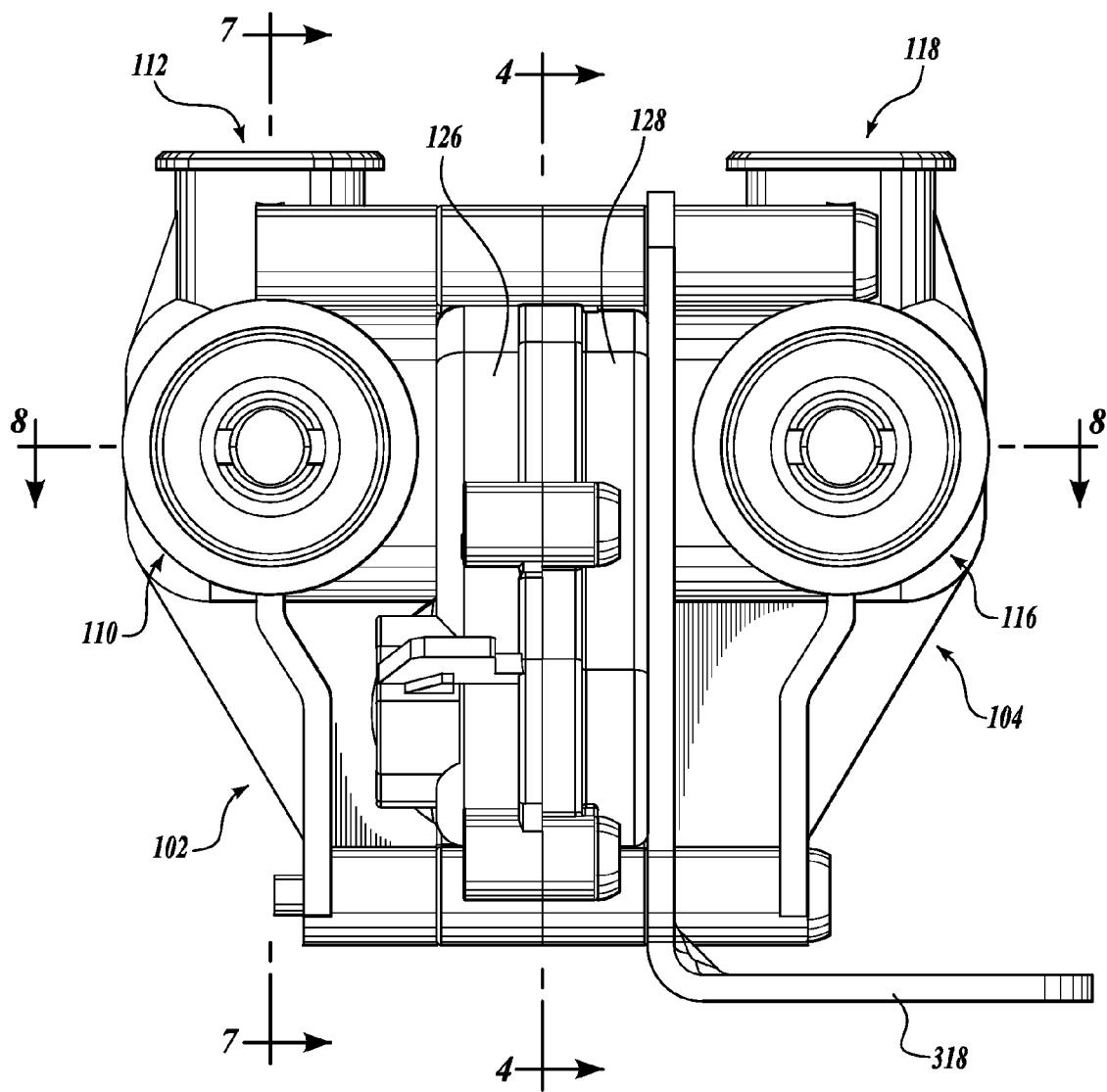
FIG. 3 is a front planar view of the fuel selector valve assembly of FIG. 1.

As shown in FIGS. 1 and 3, the fuel draw valve 102, the drive system 106, and the fuel return valve 104 are coupled together to cooperatively form a selector valve assembly 100. However, it can be appreciated that only the fuel draw valve 102 and the drive system 106 may be coupled together if the fuel return valve 104 is not needed.

As can best be seen by referring to FIGS. 2 and 6, the fuel draw valve 102 is coupled to the drive system 106 by mating the cam-receiving portion 220 with the first gear/motor interface portion 274 of the first housing receptacle 126. At least one O-Ring 294 or other seal may be received therebetween to sealingly engage the first gear/motor interface portion 274 with the cam-receiving portion 220. A plurality of fasteners such as screws, bolts, etc. pass through reciprocal openings formed in the fuel draw valve 102 and the first housing receptacle 126 to securely couple the fuel draw valve 102 to the drive system 106. Other methods of fastening, such as glue, rivets, etc. may also be appreciated.

The drive axle 172, which protrudes out of the first gear/motor interface portion 274, receives a first ball valve 120 and is thereafter received into the ball valve receptacle 222 of the fuel draw valve 102. The end of the drive axle 172 includes an axle post 312 that is rotatably received within the cylindrical receptacle 316 such that the first ball valve 120 is rotatably received within the ball valve receptacle 222.

The fuel return valve 104 is coupled to the drive system 106 in a substantially identical manner, except that a mounting bracket 318 is preferably disposed between the second housing receptacle 128 of the drive system 106 and the fuel return valve 104. The mounting bracket 318 is preferably L-shaped in cross-section, and it includes a circular opening that receives the second gear/motor interface portion 276. The mounting bracket 318 may be used for mounting the three-position selector valve 100 within a vehicle (not shown).

Operation of the selector valve assembly 100 may best be understood by referring to FIG. 4. The drive system 106 is activated to selectively place the selector valve assembly 100 in communication with the fuel tanks and the engine. The motor 132 rotates the output shaft 138, which in turn drives the worm gear 154. As such, the worm gear 154 provides rotational force to the first spur gear 156, thereby causing the first spur gear 156 to rotate in a preselected direction from its initial position. The rotation of the first spur gear 156 in turn causes the second spur gear 160 to simultaneously rotate. The rotation of the second spur gear 160 provides rotational force to drive the third spur gear 162, thereby causing the third spur gear 162 to rotate in a preselected direction from its initial position. When the third spur gear 162 is driven by the second spur gear 160, the fourth spur gear 166 also necessarily rotates. The rotational force of the fourth spur gear 166 drives the drive gear 168 and causes the drive gear 168 and drive axle 172 to rotate in a preselected direction from their initial position. In alternative embodiments of the present disclosure, the gear assembly 130 may assume a plurality of different configurations in order to transmit the rotary motion of the output shaft 138 of the motor 132.

Referring now to FIGS. 6-8, the rotation of the drive axle 172 selectively displaces the first ball valve 120 within the ball valve receptacle 222 of the fuel draw valve 102 to place the engine in communication with the first and/or second fuel tanks. When received within the ball valve receptacle 222, the first ball valve 120 is disposed between the first cam 287 and the second cam 285. The ball posts 292 of the first ball valve 120 engage the first cam surface 288 and the second cam surface 289, as shown in FIG. 8.

Referring specifically to FIG. 8, the ball cap 304 is urged into one of three positions by rotating the first ball valve 120 within the ball valve receptacle 222 such that the ball posts 292 translate along the first and second cam surfaces 288 and 289 and the ball cap 304 moves into and out of engagement with the annular seals 236. During operation of the selector valve 100, the coil spring 306 continuously urges the ball valve 120 away from the drive axle 172 as the drive axle 172 is rotated. As such, the ball posts 292 act as cam followers and guide the ball valve 120 into and out of sealing engagement with the annular seals 236. Moreover, to minimize distortion and wear of the first ball valve 120, the ball cap 304 of the first ball valve 120 does not come into substantial contact with the interior surfaces of the ball valve receptacle 222 when it is being rotated. Rather, the cam assembly is arranged such that the ball posts 292 travel along the first and second cam surfaces 288 and 289 and prevent the ball cap 304 from contacting or rubbing against the interior surface of the ball valve receptacle 222.

Referring specifically to FIG. 7, the first ball valve 120 is selectively displaced into the first position by driving the drive axle 172 in a counterclockwise direction such that the ball posts 292 travel along the upper cam surfaces 296 of the first and second cams 287 and 285 toward the first fuel tank draw port 108. As the ball posts 292 approach the first lip 278 of the first and second cams 287 and 285, the ball valve 120 is urged inwardly toward the drive axle 172, and the coil spring 306 compresses. As the ball valve 120 is urged inwardly, it continues to rotate without engaging the annular seal 236 of the first fuel tank draw port 108. The ball valve 120 continues to travel counterclockwise and is continually urged inwardly until the ball posts 292 reach the edge of the first lip 278, after which the ball posts 292 are displaced into the first pocket 290 by the force of the coil spring 306. When the ball posts 292 are displaced into the first pocket 290, the first ball valve 120 is biased, or "positively dropped" into sealing engagement with the annular seal 236 of the first fuel tank draw port 108. In other words, the ball cap 304 is dropped into engagement with the annular seal 236 so as to close the opening in the annular seal 236. The ball cap 304 of the first ball valve 120 is dropped into engagement without having made substantial contact with the seal 236 prior thereto. As a result, wear and distortion of the first ball valve 120 and annular seal 236 of the first fuel tank draw port 108 is minimized.

When the first ball valve 120 is in sealing engagement with the annular seal 236, the ball posts 292 are displaced into the first pocket 290; however, the ball posts 292 are not in contact with the first and second cam surfaces 288 and 289. Rather, the force of the coil spring 306 is used to urge the first ball valve 120 against the annular seal 236 of the first fuel tank draw port 108. In this first position, the ball cap 304 abuts the opening in the annular seal 236 to "close" the first fuel tank draw port 108. Moreover, the spring 306 maintains the positive seal between the ball valve 120 and the annular seal 236, allowing substantial control of fuel flow between the fuel selector valve assembly 100 and the first and second fuel tanks. This positive seal also prevents any unwanted siphoning due to vehicle attitude.

To move the first ball valve 120 out of the first position, the drive axle 172 rotates the ball valve 120 counterclockwise such that the ball cap 304 starts to move against the seal 236 of the first fuel tank draw port 108. After the ball valve 120 moves a certain distance on the seal 236, the ball posts 292 engage the lower cam surface 297 and are urged inwardly by the arcuate contour of the lower cam surface 297, thereby ramping the first ball valve 120 off of the annular seal 236 as the ball valve 120 is further rotated away from the seal 236. The drive axle 172 continues to rotate the ball valve 120 counterclockwise such that the ball posts 292 travel along the lower cam surface 297 away from the first pocket 290 until the first ball valve 120 has fallen off the seal 236.

To move the first ball valve 120 into the second position, and thereby "close" the second fuel tank draw port 110, the drive axle 172 continues to rotate the ball valve 120 counterclockwise until the ball posts 292 similarly engage the second lip 280 and are displaced into the second pocket 291, thereby dropping the first ball valve 120 into positive sealing engagement with the annular seal 236 of the second fuel tank draw port 110. In the second position, the ball cap 304 abuts the opening in the annular seal 236 to "close" the second fuel tank draw port 110. To move the first ball valve 120 out of the second position, the drive axle 172 continues to rotate the ball valve 120 counterclockwise to move the first ball valve 120 off the seal 236 of the second fuel tank draw port 110.

When it is desired to open both the first and second fuel tank draw ports 108 and 110, the ball valve 120 is rotated until it is moved off the seal 236 of either draw port 108, 110, or into a third position. It should be appreciated that the first and second cams 287 and 285 may include any suitably contoured cam surfaces 288 and 289 to effectively translate the ball valve 120 into at least first, second, and third positions.

When the drive axle 172 is rotated by the gear assembly 130 to drive the first ball valve 120, the second ball valve 122 necessarily rotates within the ball valve receptacle 222 of the fuel return valve 104. Thus, the second ball valve 122 may be translated between a first position, wherein the ball cap 304 positively engages the annular seal 236 of the first fuel tank return port 114, a second position, wherein the ball cap 304 positively engages the annular seal 236 of the second fuel tank return port 116, and a third position, wherein the ball cap 304 neither engages the annular seal 236 of the first fuel tank return port 114 nor the annular seal 236 of the second fuel tank return port 116.

When the first and second ball valves 120 and 122 are configured in the first position, the first fuel tank draw port 108 is sealed by the first ball valve 120 and the first fuel tank return port 114 is sealed by the second ball valve 122. As a result, the selector valve 100 draws fuel from the second fuel tank through the second fuel tank draw port 110 and directs the fuel to the engine. Moreover, the selector valve 100 directs any fuel returned from the engine back to the second fuel tank through the second fuel tank return port 116.

When the selector valve 100 is configured in a second position, the second fuel tank draw port 110 is sealed by the first ball valve 120 and the second fuel tank return port 116 is sealed by the second ball valve 122. As a result, the selector valve 100 draws fuel from the first fuel tank through the first fuel tank draw port 108 and directs the fuel to the engine. Moreover, the selector valve 100 directs any fuel returned from the engine back to the first fuel tank through the first fuel tank return port 114.

When the first ball valve 120 is configured in the third position, neither the first nor second fuel tank draw port 108, 110 are sealed by the first ball valve 120. Therefore, the selector valve 100 draws fuel from both the first and second fuel tanks through the first and second fuel tank draw ports 108 and 110 and directs the fuel to the engine. Moreover, with the second ball valve 122 in the third position, neither the first or second fuel tank return port 114, 116 are sealed by the second ball valve 122. Therefore, the selector valve 100 directs any fuel returned from the engine back to the first and second fuel tanks through the first and second fuel tank return ports 114 and 116.

Referring back to FIG. 4, the motor 132 powers the rotation of the drive axle 172 through the drive gear 168. As the drive gear 168 rotates, the drive axle 172 displaces the first and second ball valves 120 and 122 into one of multiple positions such that one of the protrusions 188 on the drive gear 168 engages one of the switches 178 on the printed circuit board 176. For instance, when the ball valves 120 and 122 are moved into the first position, wherein the ball cap 304 positively engages the annular seal 236 of the first fuel tank return port 114, the drive gear 168 is rotated such that a protrusion 188 engages a switch 178. The switch 178 is thereby tripped, sending a signal to the motor 132 to turn off.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. A selector valve having at least first and second ports, the selector valve comprising:
   (a) a closure element selectively displaceable between a first position, wherein the closure element sealingly engages the first port, and a second position, wherein the closure element sealingly engages the second port, with the closure element including two or more ball posts; and
   (b) a cam assembly configured to bias the closure element into at least the first or second position in a manner such that the closure element does not come into substantial contact with the first or second port when being moved into the first or second position, with the two or more ball posts of the closure element engaging the cam assembly and wherein when the closure element is rotated away from the first position, the engagement of the two or more ball posts with the cam assembly forces the closure element away from sealing engagement with the first port and wherein as the closure element is rotated toward the second position, the engagement of the two or more ball posts with the cam assembly allows the closure element to move into sealing engagement with the second port.

2. The selector valve of claim 1, wherein the closure element is a ball valve.

3. The selector valve of claim 1, wherein the cam assembly comprises a first cam having a first cam surface and a second cam having a second cam surface, wherein the two or more ball posts of the closure element engage and travel along the first and second cam surfaces to bias the closure element into at least the first or second position in a manner such that the closure element does not come into substantial contact with the first or second ports when being moved into the first or second position.

4. The selector valve of claim 1, wherein the closure element is displaceable into a third position in which the first and second ports remain open.

5. The selector valve of claim 1, further comprising at least first and second seals in the at least first and second ports, wherein the closure element does not come into substantial contact with the first or second seals when being moved into the first or second positions.

6. The selector valve of claim 1, wherein the two or more ball posts lose contact with the cam assembly when the closure element is substantially at either the first position or the second position.

7. A selector valve having at least first and second ports, the selector valve comprising:
(a) a ball valve selectively displaceable between a first position, wherein the ball valve sealingly engages the first port, and a second position, wherein the ball valve sealingly engages the second port, with the ball valve including two or more ball posts; and
(b) a first cam having a first cam surface and a second cam having a second cam surface, wherein the two or more ball posts of the closure element engage and travel along the first and second cam surfaces to bias the ball valve into at least the first or second position in a manner such that the ball valve does not come into substantial contact with the first or second port when being moved into the first or second position, with the two or more ball posts of the ball valve engaging the first cam surface and the second cam surface and wherein when the ball valve is rotated away from the first position, the engagement of the two or more ball posts with the first and second cam surfaces forces the ball valve away from sealing engagement with the first port and wherein as the-ball valve is rotated toward the second position, the engagement of the two or more ball posts with the first and second cam surfaces allows the ball valve to move into sealing engagement with the second port.

8. The selector valve of claim 7, wherein the ball valve is displaceable into a third position in which the first and second ports remain open.

9. The selector valve of claim 7, further comprising at least first and second seals in the at least first and second ports, wherein the ball valve does not come into substantial contact with the first or second seals when being moved into the first or second positions.

10. The selector valve of claim 7, wherein the two or more ball posts lose contact with the cam assembly when the closure element is substantially at either the first position or the second position.

11. A method of selectively placing a valve into communication with either a first or second port, the method comprising:
(a) providing a closure element, with the closure element including two or more ball posts;
(b) providing a cam assembly configured to bias the closure element into at least the first or second position in a manner such that the closure element does not come into substantial contact with the first or second port when being moved into the first or second position;
(c) selectively moving the closure element between a first position, wherein the closure element sealingly engages the first port, and a second position, wherein the closure element sealingly engages the second port; and
(d) biasing the closure element into the first or second position in a manner such that the closure element does not come into substantial contact with the first or second port when being moved into the first or second position, with the two or more ball posts of the closure element engaging the cam assembly and wherein when the closure element is rotated away from the first position, the engagement of the two or more ball posts with the cam assembly forces the closure element away from sealing engagement with the first port and wherein as the closure element is rotated toward the second position, the engagement of the two or more ball posts with the cam assembly allows the biasing to move the closure element into sealing engagement with the second port.

12. The method of claim 11, wherein the closure element is a ball valve.

13. The method of claim 11, further comprising moving the closure element into a third position, wherein the closure element is displaced between the first and second positions.

14. The method of claim 11, further comprising providing a cam assembly for biasing the closure element into the first or second position in a manner such that the closure element does not come into substantial contact with the first or second port when being moved into the first or second position.

15. The method of claim 14, wherein the cam assembly includes a first cam having a first cam surface and a second cam having a second cam surface, wherein the two or more ball posts of the closure element engage and travel along the first and second cam surfaces to bias the closure element into at least the first or second position in a manner such that the closure element does not come into substantial contact with the first or second port when being moved into the first or second position.

16. The method of claim 11, further comprising providing first and second seals in the first and second ports, with the closure element sealingly engaging the first seal in the first position and with the closure element sealingly engaging the second seal in the second position.

17. The method of claim 11, wherein the two or more ball posts lose contact with the cam assembly when the closure element is substantially at either the first position or the second position.

* * * * *